United States Patent [19]

Williamson

[11] E Patent Number: Re. 32,543

[45] Reissued Date of Patent: Nov. 10, 1987

[54] BRAKING CONTROL

[75] Inventor: Dennis F. Williamson, Kingston, Canada

[73] Assignee: Urban Transportation Development Corp., Ltd., Toronto, Canada

[21] Appl. No.: 876,680

[22] Filed: Jun. 20, 1986

Related U.S. Patent Documents

Reissue of:

[64] Patent No.: 4,405,886
Issued: Sep. 20, 1983
Appl. No.: 238,076
Filed: Feb. 75, 1981

[51] Int. Cl.[4] ..... H02P 3/18

[52] U.S. Cl. ..... 318/376; 318/757

[58] Field of Search ..... 318/364-369, 318/376, 743, 757-759, 801

[56] References Cited

U.S. PATENT DOCUMENTS

| | | | |
|---|---|---|---|
| 3,657,625 | 4/1972 | Miller et al. | 318/376 X |
| 3,688,171 | 8/1972 | Salihi et al. | 318/376 X |
| 3,781,614 | 12/1973 | Mokrytzki | 318/801 |
| 3,866,702 | 2/1975 | Eastham | 318/757 X |
| 3,890,551 | 6/1975 | Plunkett | 318/376 |

FOREIGN PATENT DOCUMENTS

| | | |
|---|---|---|
| 0967432 | 8/1964 | United Kingdom . |
| 1083982 | 9/1967 | United Kingdom . |
| 1235440 | 6/1971 | United Kingdom . |
| 1310907 | 3/1973 | United Kingdom . |
| 1460741 | 1/1977 | United Kingdom . |
| 1532125 | 11/1978 | United Kingdom . |
| 1559017 | 1/1980 | United Kingdom . |

*Primary Examiner*—William M. Shoop, Jr.
*Assistant Examiner*—W. E. Duncanson, Jr.
*Attorney, Agent, or Firm*—Bert J. Lewen; Henry Sternberg

[57] ABSTRACT

A regenerative braking system for a linear induction motor includes a control device to increase the frequency slip in a braking mode and reduce the regenerative capacity of the motor. The control device is regulated by sensing means which monitor the voltage of the external power conductor and increase the slip if the voltage exceeds a predetermined value. This reduces the power regenerated by the motor and prevents excessive voltages in the conductor. A latch prevents cycling between the full and reduced regenerative braking to prevent oscillation of the braking force and is reset upon selection of a motoring condition for the motor.

9 Claims, 5 Drawing Figures

BRAKING CONTROL

Matter enclosed in heavy brackets [ ] appears in the original patent but forms no part of this reissue specification; matter printed in italics indicates the additions made by reissue.

The present invention relates to braking systems for electrically powered vehicles and in particular to such systems which derive power from an external conductor.

It is common to use an electric motor to drive a vehicle such as a train with the electric power being supplied from an external conductor, typically a third rail alongside the track. Because the train operates in a braking mode as well as a motoring or accelerating mode, it is desirable to use the generating capacity of the motor to supply power to the conductor and thus retard the vehicle. Where the vehicle operates on a closed power loop with a second vehicle, the power generated during the braking mode by one vehicle may be used to drive the other vehicle and therefore reduce overall energy consumption.

If the motors in the vehicle require a DC power supply, the power supply to the conductor will includes a wayside AC/DC rectifier. With present technology, the rectifiers employ semiconductor techniques with the result that the rectifier is only capable of processing power in one direction only, i.e. a power flow from the external source to the conductor. However, by utilising regenerative braking, it is possible for the regenerated power to exceed the requirements of the system, for example, by two vehicles braking from a high speed simultaneously. Because the regenerated power cannot flow back to the external source, the voltage in the conductor may increase to an excessive and uncontrolled level, possibly resulting in damage to the rectifier.

It is of course possible to design the regenerative braking system so that it does not have the capacity to increase the voltage above a desired maximum value but this would result in a loss of braking capacity under most circumstances, a decrease in the overall efficiency of the system, and increased use of mechanical brakes. In some cases a carborne resistor grid can be introduced into either the dc input circuit or directly into the motor circuit which will allow full rate electrical braking without supplying regenerative energy to the dc system. Some applications, however, preclude the use of car borne resistors due to space limitations.

It is therefore an object of the present invention to obviate or mitigate the above disadvantages and provide a braking system which utilises the regenerative braking capabilities of the electric motor.

According to the present invention there is provided a regenerative braking system comprising an electric induction motor, *said motor being operable in a motoring mode wherein said motor is conditioned to receive power from a source and a braking mode wherein said motor is conditioned to supply power to said source,* an external conductor connected to said motor to transfer power between said motor and a source, sensing means to sense the voltage in said external conductor, [and] control means to control the regenerative capacity of said motor, said control means being operable to increase the slip frequency between the synchronous frequency of said motor and the control frequency supplied to said motor to reduce the said regenerative capacity upon said sensing means sensing a predetermined voltage in said conductor and thereby reduce the power delivered by said motor to the conductor *and inhibiting means to inhibit operation of said control means whilst said motor is in said motoring mode.*

An embodiment of the present invention will now be described by way of examle only with reference to the accompanying drawings in which.

Figure 1:
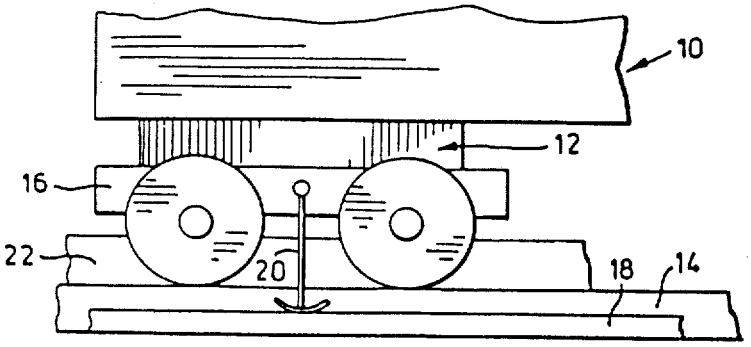
FIG. 1 is a diagramatic elevation of a portion of a rail vehicle system.

Referring now to FIG. 1, a rail vehicle system includes a vehicle 10 supported by a truck 12 on a pair of parallel rails 14.

A motor unit 16 is mounted on the truck 12 and receives electrical power from an external conductor 18 through a pick-up 20. In the illustrated embodiment, the motor unit 16 is a linear induction motor (LIM) and the rail vehicle system is provided with a reaction rail 22 positioned below the motor unit 16 and between the rails 14. Power supplied to the motor unit 16 will thus produce a force between the motor unit 16 and the reaction rail 22 to propel the vehicle 10.

Figure 2:
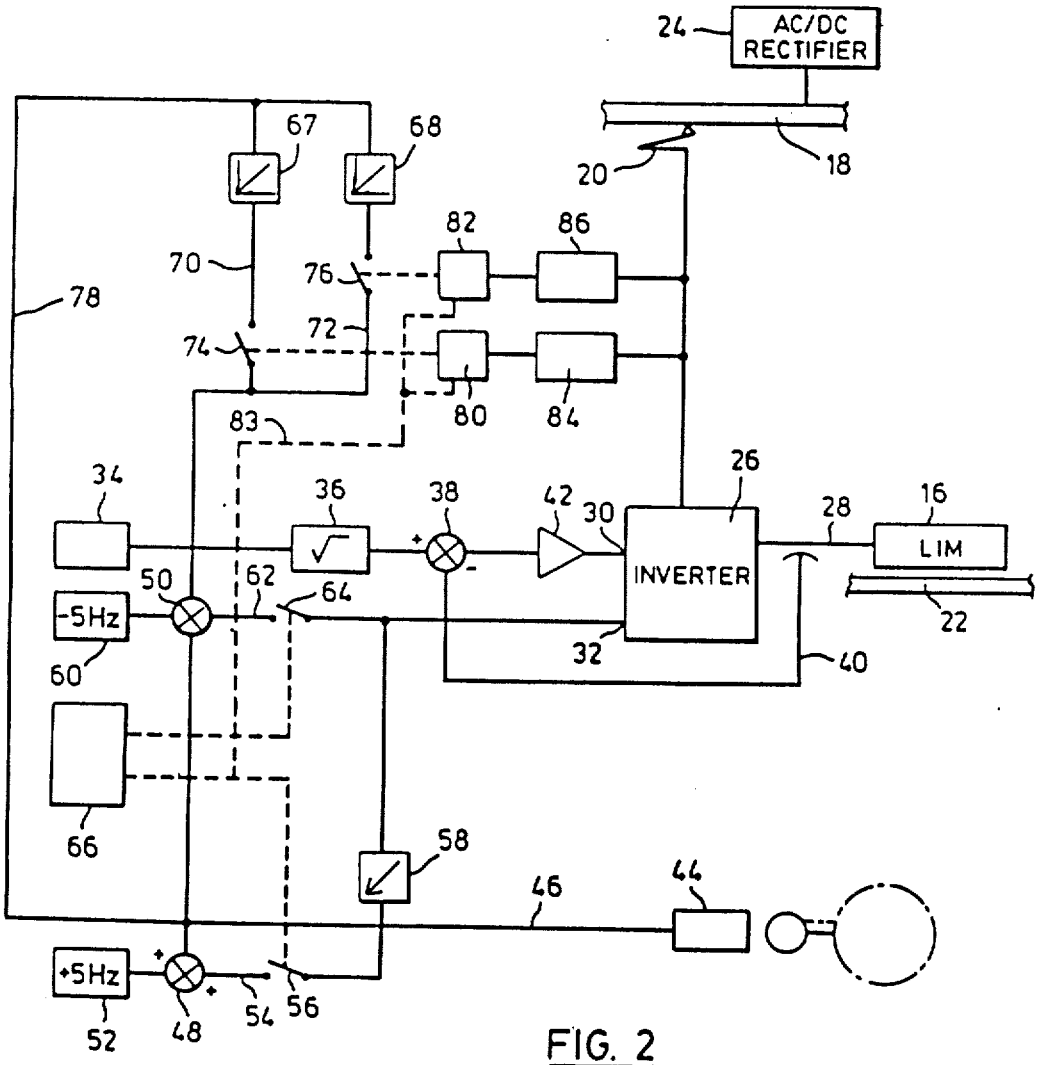
FIG. 2 is a schematic circuit diagram showing a control system for the vehicle shown in FIG. 1.

The motor unit 16 is controlled by the circuit shown in FIG. 2. D.C. power supplied from a wayside AC/DC rectifier 24 to the external conductor 18 is transmitted by the pick up 20 to an inverter 26. The inverter 26 supplies the motor unit 16 with a frequency controlled A.C. supply through line 28 to produce the required motion of the vehicle. The output of the inverter 26 is controlled by a current control signal at input 30 and a frequency control signal at input 32.

The current control signal is derived from a thrust control 34, either a manual control or an automated control, which feeds a signal proportional to the required current in line 28. The motor thrust is proportional to square of the current supplied so a square rooter 36 is interposed between the motor control 34 and a summing junction 30 to linearise the system. A signal indicative of the value of the current in output line 28 is fed to the summing junction 38 by feed back line 40 and subtracted from the thrust control signal. The difference of the two signals is fed to an amplifier 42 to produce the current control signal at input 30. The inverter 26 will therefore supply current up to the required value to line 28.

The frequency control signal is derived from a wheel mounted tachometer 44 which produces a signal whose frequency is proportional to the speed of the vehicle 10. The tachometer output is fed through line 46 to motor summing junction 48 and brake summing junction 50. A 5 Hz signal generator 52 is connected to the motor summing junction 48 and is added to the tachometer signal to produce an output signal at line 54 which is 5 Hz greater than the tachometer signal. The line 54 is connected through a motor switch 56 and speed limiter 58 to the inverter input 32.

Similarly, a 5 Hz signal generator 60 is connected to the brake summing junction 50 but is subtracted from the tachometer signal. The output of the brake summing junction in line 62 is therefore 5 Hz less than the tachometer signal and is fed through a brake switch 64 to the inverter input 32.

The switches 56 and 64 are controlled by a mode selector 66 which operates to close switch 56 when propulsion from the motor 16 is required or to close switch 64 if braking from the motor 16 is required. Thus, upon acceleration of the vehicle 10 from rest, the mode selector 66 closes the switch 56 to supply the inverter 26 with a signal corresponding to 5 Hz. The inverter 26 draws current from the conducter 18 and supplies AC current as determine by the thrust control 34 to the line 28 at +5 Hz to accelerate the vehicle 10. As the speed of the vehicle increases, the frequency signal from the tachometer 44 increases so that the current in the line 28 is supplied at a frequency 5 Hz greater than the synchronous frequency corresponding to the vehicle speed. As the vehicle speed approaches the maximum operating speed, the speed limiter 58 modifies the frequency signal so that at a predetermined value, a constant signal is fed to the input 32 to prevent further acceleration of the vehicle.

To decelerate the vehicle 10, the mode selector 66 closes switch 64 and opens switch 56. The signal fed to the inverter terminal 32 is now 5 Hz less than the synchronous frequency with the result that the motor unit 16 delivers power to the conductor 18, resulting in a negative thrust or retarding force.

Figure 3:
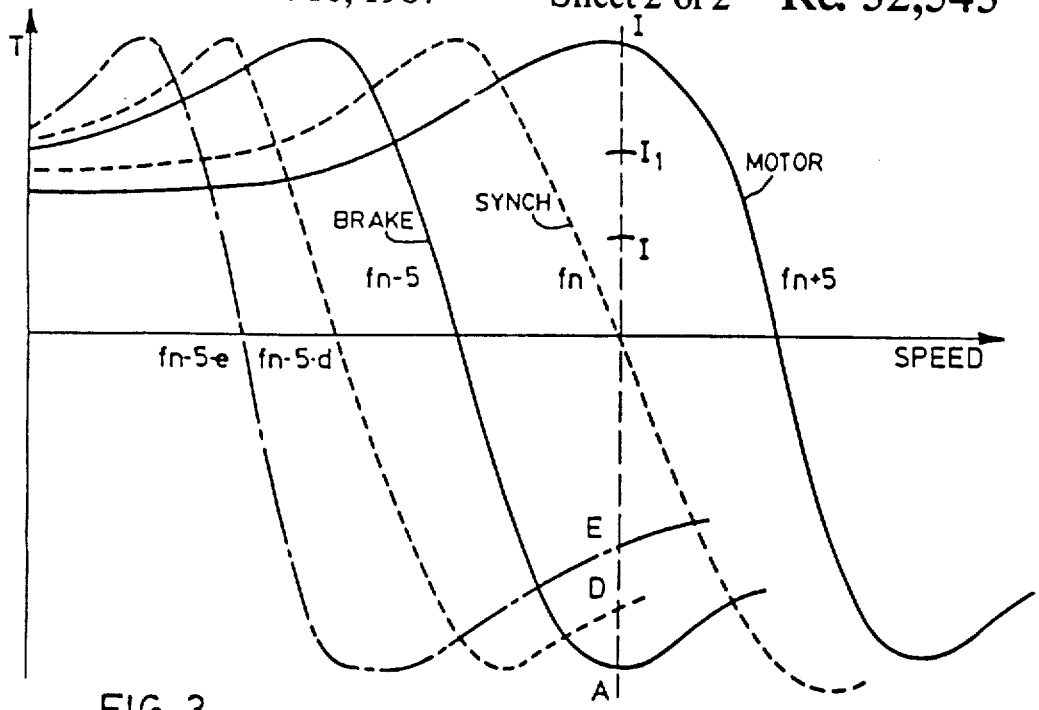
FIG. 3 is a graph showing for a given vehicle speed the relationship between motor thrust and motor speed under different applied frequencies.

This effect may best be illustrated with reference to FIG. 3 which shows a curve of thrust versus vehicle speed at various supply frequencies and a constant current I. The curve shown as "fn" denotes the curve obtained at current I by supplying the motor at a frequency corresponding to the vehicle speed S, that is the frequency generated by the tachometer 44. It will be seen that the peak thrust lags the vehicle speed and has zero value at the vehicle speed S.

The curve denoted fn +5 is the curve corresponding to the power supply with the mode selector in a motor condition and the switch 56 closed. It will be seen here that the peak thrust corresponds to the vehicle speed S indicating peak operating thrust for the motor unit 16. The peak value of the thrust may be varied by varying the supply current, as indicated by part curves $I_1$; $I_2$. In this way, the thrust from the motor unit 16 may be varied to balance the resistance to motion and a steady speed obtained.

The curve denoted fn −5 indicates the curve obtained when operating in the braking mode with the switch 64 closed. It will be seen that the motor unit is now operating at maximum negative thrust, i.e. maximum braking effect at the vehicle speed S. This is indicated as point A on the fn −5 curve. From FIG. 5 it can be seen that at point A, the motor unit 16 is supplying the maximum power to the conductor 18 for the vehicle speed S. As the speed of the vehicle 10 decreases, the frequency generated by the tachometer 44 decreases so that the slip between the synchronous frequency of the motor unit 16 and the supply frequency remains constant. The braking thrust will thus follow the curve fn −5 in FIG. 4, indicating that the braking thrust increases as the vehicle speed decreases, whereas FIG. 5 shows that the power supplied decreases.

Figure 4:
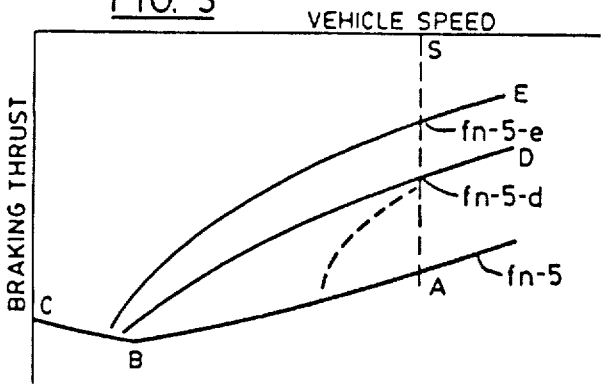
FIG. 4 is a graph showing the relationship between vehicle speed and braking thrust for a vehicle controlled by the circuit of FIG. 2.
Figure 5:
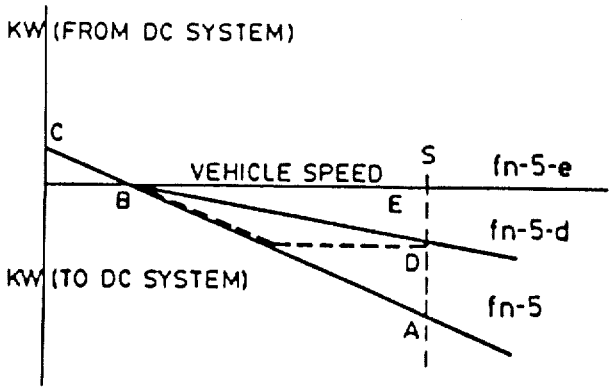
FIG. 5 is a curve showing the relationship between power supply and vehicle speed for a vehicle operating in the braking mode under the control of the circuit of FIG. 2.

As the frequency of the supply approaches 0 Hz, the vehicle will still have a forward speed, as denoted by point B on FIGS. 4 and 5. At this point, the phase rotation of the supply from the inverter 26 to the motor unit 16 is reversed so that the inverter is now effectively driving the motor unit 16 in a reverse direction. This condition, commonly referred to as "plug braking" requires power from the conductor 18 as indicated by line BC of FIG. 5.

Under normal operating conditions, the power supplied by the motor unit 16 during braking may be used to power a further vehicle on the loop. If however the system cannot absorb the power supplied, the voltage of the conductor 18 will tend to rise as the wayside rectifier 24 cannot pass power in a reverse direction. To avoid this condition whilst providing a system that may utilize regenerative braking, the regenerative capacity of the motor unit 16 is varied, so reducing the power supplied to the conductor 18.

Referring now to FIG. 2, the variation in regenerative capacity is achieved in the preferred embodiment by a pair of signal generators 67, 68 connected through lines 70, 72 and switches 74, 76 respectively to the brake summing junction 50. The output of the signal generators 66, 68 is regulated by the output of tachometer 44 fed through line 78 so that as the vehicle speed decreases, the output of the signal generators 67, 68 decreases.

The switches 74, 76 are controlled by latches 80, 82 which in turn are operated by threshold detectors 84,86. The threshold detectors are connected to the pick up 20 and are therefore subjected to the voltage of the conductor 18. The threshold detector 84 is set to provide an output signal upon attainment of a first voltage level, for example 720 volts, in the conductor 18. Upon attainment of this voltage, the latch 80 closes switch 74 to feed a signal "d" from the signal generator 67 to the brake summing junction 50. The signal "d" is subtracted from the tachometer signal so that the signal in line 62 now has a value of (fn −5−d). As can be seen from FIG. 3, the effect of reducing the supply frequency by d is to move the characteristic curve toward the abscissa so that at the vehicle speed S, the negative thrust has the value denoted by point D. The braking thrust is thus decreased but the power supplied to the conductor 18 is also decreased as can be seen in FIG. 5. As the vehicle speed decreases, the value of the signal "d" also decreases until at point B it is zero and the braking thrust and power generation corresponds to that obtained with the 5 Hz slip.

Should the voltage in the conductor 18 continue to increase beyond the threshold set by the detector 84, the threshold detector 86 will operate at a higher voltage, say 840 volts, and cause latch 82 to close switch 76. A signal from the signal generator 68 is fed to the summation junction 50 so that the signal fed to the inverter input has a value fn −5−e to increase the slip in the motor unit 16. This effect is illustrated in FIG. 3 as the curve fn −5−e and it can be seen that at vehicle speed S, the negative thrust is further reduced to the point E. The signal from the generator 68 reduces as the vehicle speed reduces so that at point B, it is again 0. The value of the signal from the generator 68 is chosen so that no power is supplied to the conductor 18 throughout the speed range of the vehicle 10, as shown by curve fn −5 −e in FIG. 5.

When operating at minimum regenerative braking, i.e. on curve fn −5−e, the braking of the vehicle is supplemented by conventional mechanical brakes. During this time, the voltage in the conductor may reduce but to avoid cycling between the mechanical brakes and regenerative braking, the latches 80,82 are held closed until they are reset by reset line 83 controlled by the mode selector 66. The reset line 83 is activated upon the mode selector 66 being moved from "Brake" to "Motor" functions and opens the switches 74, 76 and resets the latches 80, 82.

The system described above is particularly useful when used with a LIM as the kinetic energy absorbed during the braking mode is dissipated either as a power supply to the conductor 18 or as heat to the reaction rail 22. Thus the motor unit 16 may operate at a relatively low regenerative capacity without undue adverse effects in the motor unit 16. In addition, it may be seen that the variation of regenerative capacity is achieved in a relatively simple manner and that the use of the reset line 83 prohibits undesirable cycling between braking modes.

It will be apparent that a number of modifications may be utilised, such as single proportional control in place of the detectors 84, 86 to provide increased slip as the voltage rises rather than step responses. As a further variation, the signal generators 67 may also be non-linear to provide non linear variations in slip frequency and provide increased power supply and braking thrust over a proportion of the vehicle speed range. Such an effect is shown in chain dotted lines in FIGS. 4 and 5.

I claim:

1. A regenerative braking system comprising an electric induction motor, *said motor being operable in a motoring mode wherein said motor is conditioned to receive power from a source and a braking mode wherein said motor is conditioned to supply power to said source,* an external conductor connected to said motor to transfer power between said motor and a source, sensing means to sense the voltage in said external conductor, [and] control means to control the regenerative capacity of said motor, said control means being operable to increase the slip frequency between the synchronous frequency of said motor and the control frequency supplied to said motor to reduce said regenerative capacity upon said sensing means sensing a predetermined voltage in said conductor and thereby reduce the power delivered by said motor to the conductor *and inhibiting means to inhibit operation of said control means whilst said motor is in said motoring mode.*

2. A regenerative braking system according to claim 1 wherein said control means includes latch means to maintain said motor at said reduced regenerative capacity upon reduction of said voltage in said conductor below said predetermined value.

3. A regenerative braking system according to claim 2 including command means to condition said motor from [a] *said* braking mode to [a motor] *said motoring* mode and wherein said command means includes reset means operable to release said latch means upon said motor being conditioned to said motoring mode.

4. A regenerative braking system according to claim 3 including signalling means to produce a signal dependant on vehicle speed, said signalling means being operable upon said control means to vary the reduction in regenerative capacity upon a reduction in vehicle speed.

5. A regenerative braking system according to claim 1 wherein said sensing means includes first detector means operable to produce a first reduction in regenerative capacity upon attainment of a first voltage in said conductor and second detector means operable to produce a further reduction in regenerative capacity upon attainment of a second voltage in said conductor.

6. A drive and braking system for a vehicle comprising an electric motor, power supply means to supply power from an external source to said motor, command means to condition said motor in either a [first condition] *motoring mode* in which said motor receives power from said power supply to drive said vehicle or a [second condition] *braking mode* in which said motor supplies power to said power supply to retard said vehicle, control means to control the efficiency of said motor and sensing means to sense the voltage of said power supply means, said control means *being inoperative when said motor is in said motoring mode and* being operable when said motor is in said [second condition] *braking mode* to reduce the efficiency of said motor and thereby reduce the power generating capacity thereof upon said sensing means sensing a predetermine voltage at said power supply means.

7. A control system for an induction motor to permit regenerative braking thereby comprising current supply means to connect said motor and an external source, frequency control means to control the frequency at which said current is supplied to said motor, said frequency control means including a synchronous frequency generator to provide a first signal indicative of the synchronous frequency of said motor, a slip frequency generator to generate a second signal proportional to the slip frequency, mode control means to condition said frequency control means to either a motoring mode in which said first and second signals are added increase the supply frequency above said synchronous frequency to provide power to said motor from said source or a braking mode in which said first and second signals are subtracted to reduce the supply frequency of said motor to less than said synchronous frequency, to provide power from said motor to said source, and slip modifying means operable in said braking mode to reduce further said supply frequency, said slip modifying means *being inoperative in said motoring mode* being controlled by sensing means to sense the voltage of said external source whereby upon said voltage attaining a predetermined value, said slip modifying means reduces the supply frequency to reduce the regenerative capacity of said motor.

8. A control system according to claim 7 wherein said slip modifying means includes a signal generator whose output is directly proportional to the synchronous frequency of said motor.

9. A control system according to claim 8 including latch means to maintain said further reduction until said mode control means conditions said frequency control means to said motoring condition.

* * * * *

UNITED STATES PATENT AND TRADEMARK OFFICE

CERTIFICATE OF CORRECTION

PATENT NO. : Re. 32,543

DATED : November 10, 1987

INVENTOR(S) : Dennis F. Williamson

It is certified that error appears in the above-identified patent and that said Letters Patent is hereby corrected as shown below:

Column 6, claim 6, line 28, delete "predetermine" and substitute therefor --predetermined--.

Column 6, claim 7, line 49, after "mode" insert --and--.

Signed and Sealed this

Fifth Day of April, 1988

*Attest:*

DONALD J. QUIGG

*Attesting Officer*

*Commissioner of Patents and Trademarks*